US012442385B2

(12) United States Patent
Taieb et al.

(10) Patent No.: US 12,442,385 B2
(45) Date of Patent: Oct. 14, 2025

(54) TURBOMACHINE PROVIDED WITH A MAGNETIC DRIVE PUMP

(71) Applicant: SAFRAN HELICOPTER ENGINES, Bordes (FR)

(72) Inventors: David Simon Serge Taieb, Moissy-Cramayel (FR); Jean-Marie Andre Robert Gigon, Moissy-Cramayel (FR); Franck Albert Robert Dupeu, Moissy-Cramayel (FR)

(73) Assignee: SAFRAN HELICOPTER ENGINES, Bordes (FR)

(*) Notice: Subject to any disclaimer, the term of this patent is extended or adjusted under 35 U.S.C. 154(b) by 120 days.

(21) Appl. No.: 18/565,441

(22) PCT Filed: Jun. 1, 2022

(86) PCT No.: PCT/FR2022/051038
§ 371 (c)(1),
(2) Date: Nov. 29, 2023

(87) PCT Pub. No.: WO2022/254148
PCT Pub. Date: Dec. 8, 2022

(65) Prior Publication Data

US 2024/0141911 A1 May 2, 2024

(30) Foreign Application Priority Data

Jun. 3, 2021 (FR) ....................................... 2105859

(51) Int. Cl.
*F04D 29/048* (2006.01)
*F02C 7/22* (2006.01)

(52) U.S. Cl.
CPC .............. *F04D 29/048* (2013.01); *F02C 7/22* (2013.01)

(58) Field of Classification Search
CPC .. F02C 7/22; F04C 19/007; F04C 2/10; F04C 29/0064; F04C 7/00; F04D 29/048; F05D 2240/511
(Continued)

(56) References Cited

U.S. PATENT DOCUMENTS 4,361,419 A * 11/1982 Vohringer ............... F04C 2/102 418/73
5,145,329 A 9/1992 Zumbusch et al.
(Continued)

FOREIGN PATENT DOCUMENTS

DE 102017222754 A1 6/2019
FR 3102510 A1 4/2021

OTHER PUBLICATIONS

International Search Report received for PCT Patent Application No. PCT/FR2022/051038, mailed on Sep. 26, 2022, 6 pages (2 pages of English Translation and 4 pages of Original Document).

*Primary Examiner* — Mark A Laurenzi
*Assistant Examiner* — Benjamin Doyle
(74) *Attorney, Agent, or Firm* — WOMBLE BOND DICKINSON (US) LLP

(57) ABSTRACT

A turbomachine including a rotary body including a motor shaft supplying mechanical power, and at least one magnetic drive pump including at least: one stator delimiting an annular inner space and including a first and a second flange, a rotor arranged in the inner space between the first and second flanges and capable of driving fluid, the rotor being able to rotate about an axis of rotation, a pair of magnets having opposite polarities coaxially arranged on the rotor with the axis of rotation, a magnet arranged on the first flange in order to co-operate with one of the magnets of the
(Continued)

pair of magnets of the rotor, a magnetic rotator for rotating the rotor arranged on the second flange, the second flange being non-magnetic.

7 Claims, 4 Drawing Sheets

(58) Field of Classification Search
USPC .......................................... 417/423.7, 423.12
See application file for complete search history.

(56) References Cited

U.S. PATENT DOCUMENTS

| | | | | |
|---|---|---|---|---|
| 5,713,730 | A * | 2/1998 | Nose | A61M 60/422 417/424.2 |
| 5,725,357 | A * | 3/1998 | Nakazeki | F04D 29/048 417/18 |
| H1966 | H * | 6/2001 | Henry, IV | 417/356 |
| 6,881,033 | B2 * | 4/2005 | Makinson | F04D 13/0606 417/423.12 |
| 8,801,405 | B2 * | 8/2014 | Hoshi | F04D 13/025 416/182 |
| 9,127,680 | B2 * | 9/2015 | Yanai | A61M 60/824 |
| 10,166,318 | B2 * | 1/2019 | Yu | A61M 60/232 |
| 11,035,360 | B2 * | 6/2021 | Wang | F04C 2/102 |
| 11,168,690 | B2 * | 11/2021 | Hemphill | F04C 15/06 |
| 12,109,404 | B2 * | 10/2024 | Granegger | A61M 60/531 |
| 2003/0091450 | A1 * | 5/2003 | Davis | A61M 60/237 417/423.7 |
| 2012/0095280 | A1 * | 4/2012 | Timms | F04D 13/0633 600/16 |
| 2012/0245680 | A1 * | 9/2012 | Masuzawa | A61M 60/538 623/3.11 |
| 2013/0064695 | A1 * | 3/2013 | Kim | F04D 13/06 417/357 |
| 2015/0162799 | A1 * | 6/2015 | Llan | F16F 15/03 310/90.5 |
| 2021/0348607 | A1 * | 11/2021 | Forni | H02K 7/10 |
| 2022/0372973 | A1 | 11/2022 | Dupeu et al. | |
| 2023/0064430 | A1 * | 3/2023 | Dupeu | F02C 7/236 |

* cited by examiner

TURBOMACHINE PROVIDED WITH A MAGNETIC DRIVE PUMP

TECHNICAL FIELD OF THE INVENTION

The present invention relates to the field of turbomachines of the type comprising a rotary body including a motor shaft supplying mechanical power, and at least one magnetic drive pump.

The invention applies to all types of turbomachines, in particular those used in aircraft such as turbojet engines, turboprop engines and turbomachines with unducted fans, also known as "Open Rotors".

TECHNOLOGICAL BACKGROUND

The technical background includes the document FR3102510 A1.

A conventional turbomachine comprises one or more rotary bodies. Each rotary body comprises a compressor, a turbine and a motor shaft connecting the turbine to the compressor to drive the compressor in rotation. A portion of the power generated by the turbomachine is used to drive various accessories (or auxiliary machines) required to operate the turbojet engine or aircraft, such as a lubrication pump or fuel pump.

To this end, the turbomachine generally includes an accessory gearbox linking the motor shaft to the pumps. When the motor shaft is driven in rotation, the accessory gearbox transmits the rotational movement to the various accessories. In other words, the mechanical energy produced by the motor shaft is transmitted to the pumps via the accessory gearbox.

However, this technical solution has the following disadvantages:

- a portion of the mechanical power delivered by the rotary body is used to drive the pump(s),
- the rotational speed of the pump(s) is dependent on the rotational speed of the motor shaft, so the pump(s) cannot be controlled at an independent motor speed,
- the mechanical connection between the motor shaft and the pump(s) requires dynamic seals that are difficult to achieve and wear out over time,
- the pump(s) comprise(s) a rotation shaft supported by mechanical bearings subject to mechanical wear due to friction, which greatly reduces the yield of the pump(s)
- the mechanical connection between the motor shaft and the pump(s) requires the pump(s) to be positioned close to the accessory gearbox, which greatly limits the possibilities of installing the pump(s) in a turbomachine and subjects it to thermal stresses.

SUMMARY OF THE INVENTION

The aim of the present invention is to remedy at least one portion of these disadvantages and to provide a turbomachine comprising a pump that is mechanically decoupled from the motor shaft and in which the physical contact between the rotor of the pump and the rest of the pump is eliminated.

To this end, the invention relates to a turbomachine comprising a rotary body comprising a motor shaft supplying mechanical power, and at least one magnetic drive pump comprising at least:

- a stator defining an annular internal volume and comprising a first and second flanges,
- a rotor arranged in the internal volume between the first and second flanges and capable of driving a fluid, the rotor being able to rotate about an axis of rotation,
- a pair of magnets having opposite polarities coaxially arranged on the rotor with the axis of rotation,
- a magnet arranged on the first flange to cooperate with one of the magnets of the pair of magnets of the rotor,
- means for magnetically driving the rotor in rotation away from the rotor via the second flange, the second flange being non-magnetic.

The turbomachine according to the invention is thus equipped with one or more pumps which can either be mechanically decoupled from the motor shaft and then controlled independently of the engine speed, or magnetically coupled to the motor shaft. This gives greater freedom in the choice of the rotational speed of the pump and the possibilities of implantation of the pump(s) in the turbomachine. In fact, the pump is driven in rotation by a magnetic drive instead of a mechanical shaft.

In addition, the mechanical bearings of the prior art are replaced by a "magnetic" bearing formed by the magnets arranged on the rotor and the stator coaxially with the axis of rotation of the rotor, thus eliminating the physical contact between the rotor and the rest of the pump.

In this way, the magnets in the pump allow the rotor of the pump to be rotated and the rotor to be wedged in the pump axially magnetically and radially by the magnetic field.

According to a particular characteristic of the invention, the magnetic drive means comprises a shaft mechanically coupled to the motor shaft of the rotary body of the turbomachine or to the motor shaft of an electric machine and a pair of magnets having opposite polarities coaxially arranged with the axis of rotation and secured to the shaft, and the second flange comprises a bearing housing said pair of magnets of the magnetic drive means.

The rotor of the pump can thus be driven by the drive means in the same way as in a magnetic coupling by the rotation of the external shaft without contact between them by an axial flux coupling between the magnets of the rotor and the magnets of the drive means.

Advantageously, the magnets of the pair of magnets arranged on the rotor, the magnet arranged on the first flange and the magnets of the magnetic drive means are permanent magnets.

According to a particular characteristic of the invention, the magnets of the pair of magnets arranged on the rotor, the magnet arranged on the first flange and the magnets of the magnetic drive means form a row of magnets of alternating polarities.

Preferably, the magnetic drive pump(s) is of the liquid ring, lateral channel or gerotor type.

According to another particular characteristic, at least one of the pumps is arranged and configured to supply the turbomachine with fuel or lubricant, or to transfer fuel between compartments of a tank of a turbomachine, or to pressurise an air compressor, or to be used in a non-bleed de-icing system.

Another object of the invention is an aircraft comprising at least one turboprop engine or a turbojet engine comprising a turbomachine according to the invention.

BRIEF DESCRIPTION OF THE FIGURES

The invention will be better understood, and other details, characteristics and advantages of the present invention will become clearer from the following description made by way of non-limiting example and with reference to the attached drawings, in which.

The elements having the same functions in the different embodiments have the same references in the figures.

DETAILED DESCRIPTION OF THE INVENTION

The invention is generally applicable to any turbomachine equipped with at least one pump that is controlled independently of the engine speed of the turbomachine. It applies in particular, but not exclusively, to liquid ring, lateral channel or regenerative and gerotor pumps. The invention can also be applied to centrifugal or positive displacement gear pumps.

Figure 1:
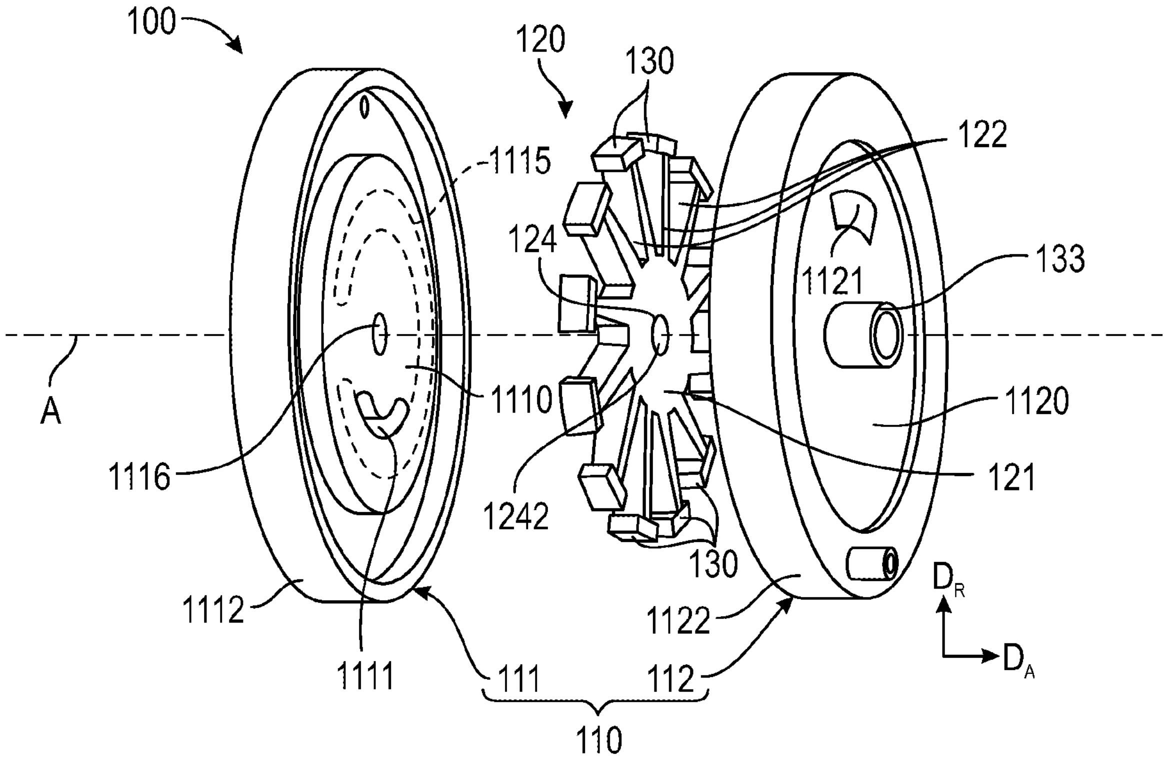
FIG. 1 is a schematic exploded perspective view of an electromagnetic pump according to one embodiment of the invention.
Figure 2:
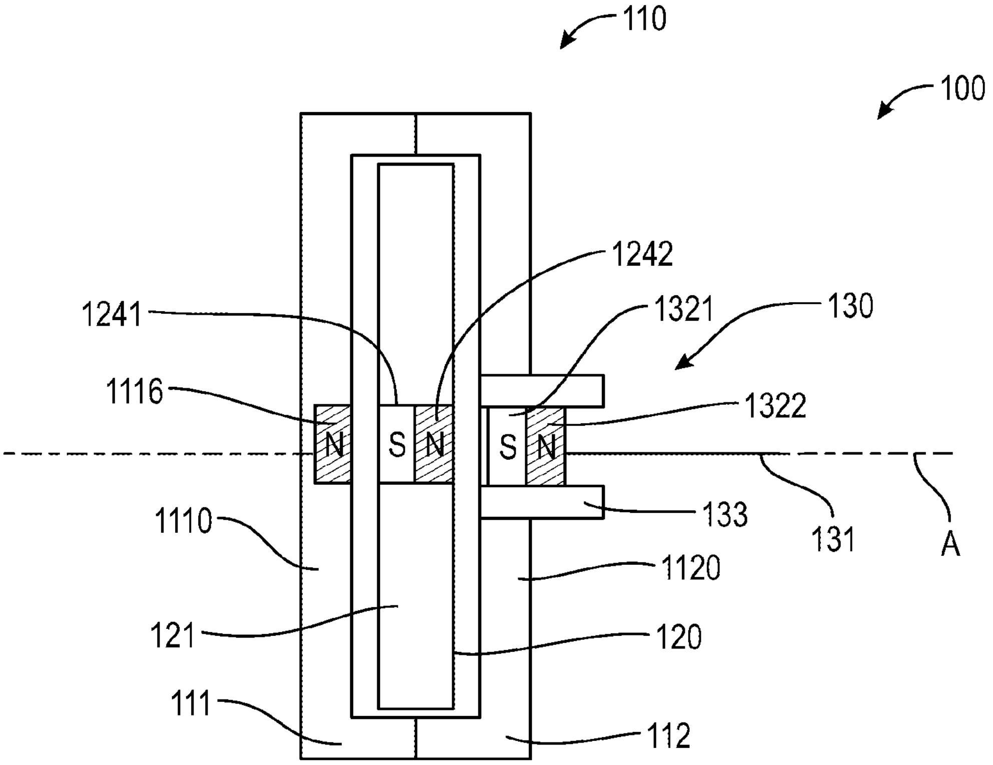
FIG. 2 is a schematic cross-section along the longitudinal axis of the electromagnetic pump in FIG. 1.

FIGS. 1 and 2 illustrate an electromagnetic pump 100 according to one embodiment of the invention. In the example described here, the electromagnetic pump 100 is a pump of the liquid ring type comprising a fixed pump body or stator 110 delimiting an annular internal volume and comprising a first half-casing 111 and a second half-casing 112. The first half-casing 111 comprises a solid cylindrical central portion 1110, forming a first flange, and a circular external wall 1112 extending concentrically around the central portion 1110. The first flange 1110 is provided with a suction or discharge port 1111.

Similarly, the second half-casing 112 comprises a solid cylindrical central portion 1120, forming a second flange, and a circular external wall 1122 extending concentrically around the central portion 1120. The second flange 1120 comprises a discharge or suction port 1121. The second flange 1120 is non-magnetic.

In addition, the electromagnetic pump 100 comprises a blade wheel 120, also known as a rotor or impeller, arranged in the internal volume between the two flanges of the stator and capable of driving a fluid. The rotor 120 is able to rotate about an axis of rotation A in an axial direction D A and comprises a wheel 121 provided with a plurality of blades 122 extending from the wheel along a radial direction DR.

The blade wheel 120 comprises a magnetic rotation shaft 124 extending along the axial direction $D_A$, formed by a pair of magnets, preferably permanent magnets, having opposite polarities arranged on the blade wheel 120 of the rotor coaxially with the axis of rotation A. In the example described here, the pair of magnets comprises two magnetised pads extending along the axis of rotation in the axial direction $D_A$, one 1241 with a south pole and the other 1242 with a north pole. By magnetised pad, we mean a magnet of cylindrical shape, the axis of which is in the axial direction $D_A$. To this end, the blade wheel 120 comprises a through orifice extending along the axis of rotation A in which the pair of magnets 1241, 1242 is housed.

In addition, the first flange 1110 comprises a cylindrical cavity extending along the axis of rotation A housing a magnet 1116, preferably permanent and in the form of a magnetised pad. The magnet 1116 of the first flange 1110 is arranged coaxially with the axis of rotation A and therefore with the pair of magnets 1241, 1242 of the rotor. It is adapted to cooperate with one of the rotor magnets arranged opposite it. In other words, the magnet 1116 of the first flange 1110 is arranged opposite the magnet 1241 and has a polarity opposite to that thereof. Thus, in the example described here, the magnet 1116 has a north pole as the magnet 1241 of the rotor arranged opposite it has a south pole.

In addition, the magnetic drive pump 100 comprises a means 130 for magnetically driving the rotor to rotate without contact. The magnetic drive means 130 is arranged on the second flange 112. The magnetic drive means 130 is spaced from the rotor 120 in particular by the second non-magnetic flange 112. It comprises a shaft 131 mechanically coupled to the motor shaft of the rotary body of the turbomachine or of an electric machine and a pair of magnets, preferably permanent magnets, having opposite polarities arranged coaxially with the axis of rotation A and secured to the shaft 131, for example by adhesive bonding. In the example described here, the pair of magnets comprises two magnetised pads extending along the axis of rotation in the axial direction $D_A$, one 1321 with a south pole and the other 1322 with a north pole. To this end, the second flange 1120 comprises a bearing 133 housing said pair of magnets of the magnetic drive means. The bearing extends from an external face of the second flange, i.e., opposite an internal face of the second flange arranged opposite the rotor.

Thus, the magnets 1241, 1242 of the pair of magnets arranged on the rotor, the magnet 1116 arranged on the first flange and the magnets 1321, 1322 of the magnetic drive means 130 are coaxial and form a row of magnets of alternating polarities.

The magnet 1116 of the first flange and the magnets 1321, 1322 of the magnetic drive means 130 act as magnetic bearings for the magnetic rotating shaft 124 of the rotor and thus advantageously replace the mechanical bearings of the prior art. This is because they allow to wedge the rotor axially, magnetically and passively, i.e., without any physical contact between the rotor and the rest of the pump. They also allow to wedge the rotor radially by induced magnetic fields.

The rotor of the pump can thus be driven by the drive means 130 in the same way as in a magnetic coupling by the rotation of the external shaft 131 without contact between them by an axial flux coupling between the magnets 1241, 1242 of the rotor and the magnets 1321, 1322 of the drive means 130.

Figure 3:
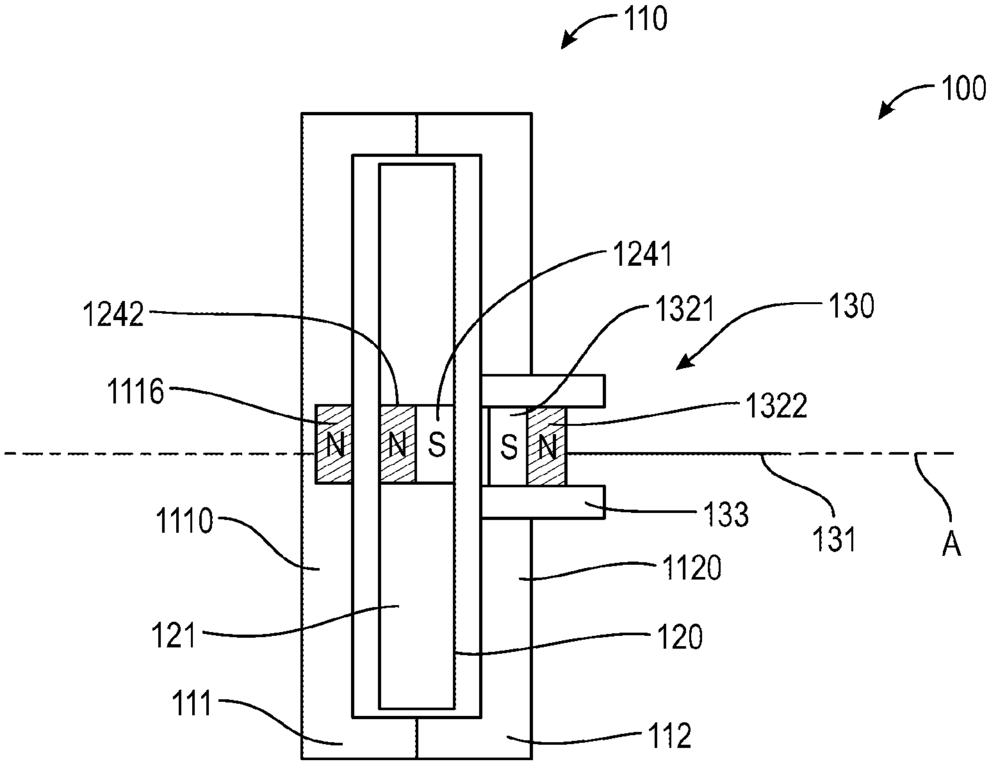
FIG. 3 is a schematic cross-sectional view along the longitudinal axis of the electromagnetic pump of FIG. 1 in one variant.

Alternatively, as shown in FIG. 3, the magnet 1116 of the first flange 1110 is arranged opposite the magnet 1242 of the rotor and has the same polarity, in this case a north pole. The other magnet 1241 of the pair of magnets of the rotor is arranged opposite the magnet 1321 of the magnetic drive means 130 and are of the same polarity, in this case a south pole.

According to another non-illustrated embodiment, the magnets of the rotor are formed by an arrangement of magnetised pads of the same polarity forming magnetised discs and the magnets of the magnetic drive means are formed by an arrangement of magnetised pads of opposite polarity to that of the magnetised disc of the rotor arranged opposite and also forming a magnetised disc. The magnetised disc of the rotor and the magnetised disc of the magnetic drive are arranged opposite each other to allow magnetic coupling between them. The number of magnetic pads and the corresponding dimensions of the magnetised discs of the rotor and the magnetic drive are chosen according to the axial and radial wedge power requirements and the drive power required.

Once all the elements of the pump 100 have been assembled, the permanent magnets 1241, 1242 face the magnets 1321, 1322 of the drive means 130 along a radial direction D R as shown in FIGS. 2 and 3. The control of the electromagnetic pump 100 (torque and speed of rotation) is achieved by monitoring the torque and rotational speed of the shaft of the drive means 130.

As is known in the pumps of the liquid ring type, the shaft is placed eccentrically on the blade wheel 120, for example by means of a spacer (not shown in FIGS. 1 and 2), so as to create inter-blade (or inter-vane) volume variations which enable the pumped fluid to be sucked in, for example via the port 1111, and then evacuated under pressure, for example via the port 1121.

The pump 100 can also be a lateral channel pump, also known as a regenerative pump. In this case and in a known way, a lateral channel present here on the half-casings 111 and 112 extends between the ports 1111 and 1121. Only the lateral channel 1115 on the half-casing 111 is shown dotted in FIG. 1. The evolution of the inter-blade (or inter-vane) volume variations, combined with the velocity field (vortex) present in the lateral channel 1115, enables the fluid to be sucked in, for example via the port 1111, and then evacuated under pressure, for example via the port 1121.

Although the invention has been described for pumps of the liquid ring or lateral channel type, it can also be applied, for example, to gerotor, centrifugal or positive displacement gear pumps.

An electromagnetic pump according to the invention can be used in particular to supply fuel or lubricant to the turbomachine or to transfer fuel between compartments of a tank of a turbomachine.

Figure 4:
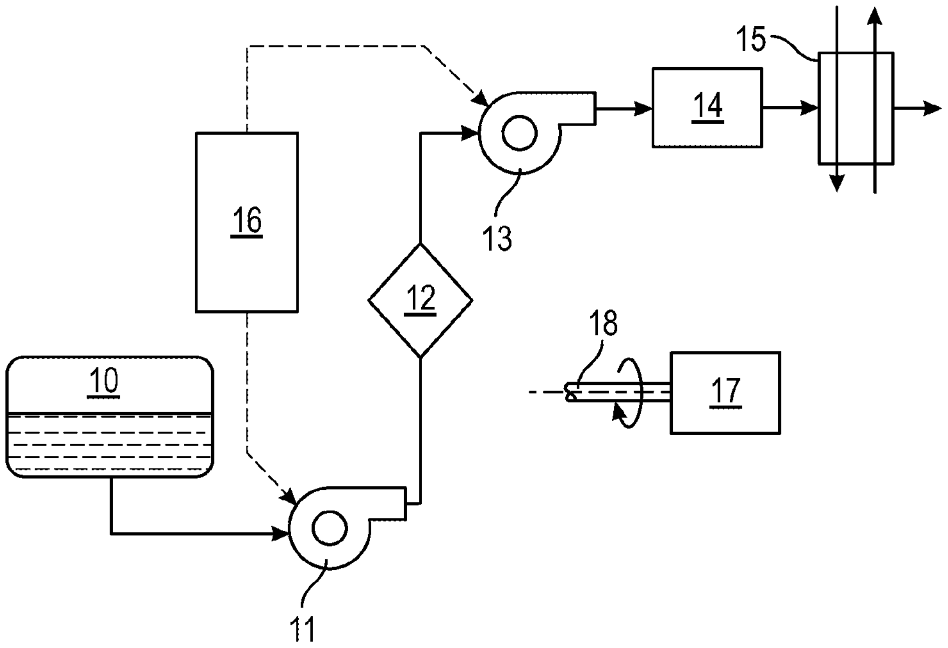
FIG. 4 is a schematic representation of a turbomachine according to the invention.

FIG. 4 illustrates an example of a turbomachine which comprises a fuel supply line consisting of a fuel tank 10, a low-pressure pump 11, a filter 12, a high-pressure pump 13, a metering device 14 and an oil/fuel heat exchanger 15. The turbomachine also includes an accessory gearbox 17 to which a motor shaft 18 is connected to deliver mechanical power to the turbomachine. In accordance with the invention, the low-pressure pump 11 consists of an electromagnetic pump, for example of the liquid ring type or of the lateral channel or regenerative type or of the volumetric gear type as described above in the case of drive by an electric machine. The low-pressure pump 11 is mechanically decoupled from the motor shaft 18 and is controlled independently, for example by the digital computer 16 integrated into the control device of the turbomachine.

In the oil supply circuit of a turbomachine, the low-pressure and/or high-pressure supply pumps can also be replaced in whole or in part by electromagnetic pumps controlled independently of the engine speed. In this case, gerotor pumps are preferred but not exclusively used.

The invention claimed is:

1. A turbomachine comprising a rotary body comprising a motor shaft supplying mechanical power, and at least one magnetic drive pump comprising at least:

- a stator delimiting an annular internal volume and comprising a first flange and a second flange,
- a rotor arranged in the internal volume between the first flange and the second flange and capable of driving a fluid, the rotor being able to rotate about an axis of rotation,
- a pair of magnets having opposite polarities coaxially arranged on the rotor with the axis of rotation,
- a magnet arranged on the first flange to cooperate with one of the magnets of the pair of magnets of the rotor,
- and means for magnetically driving the rotor in rotation arranged on the second flange, the second flange being non-magnetic.

2. The turbomachine according to claim 1, wherein the magnetic drive means comprises a drive shaft mechanically coupled to the motor shaft of the rotary body of the turbomachine and a pair of magnets having opposite polarities arranged coaxially with the axis of rotation and secured to the drive shaft, and the second flange comprises a bearing housing said pair of magnets of the magnetic drive means.

3. The turbomachine according to claim 2, wherein the magnets of the pair of magnets arranged on the rotor, the magnet arranged on the first flange and the magnets of the magnetic drive means are permanent magnets.

4. The turbomachine according to claim 2, wherein the magnets of the pair of magnets arranged on the rotor, the magnet arranged on the first flange and the magnets of the magnetic drive means form a row of magnets of alternating polarities.

5. The turbomachine according to claim 1, wherein the at least one magnetic drive pump is of the liquid ring, lateral channel, gerotor, centrifugal or positive displacement gear type.

6. The turbomachine according to claim 1, wherein at least one pump of the at least one magnetic drive pumps is arranged to supply the turbomachine with fuel or lubricant.

7. An aircraft comprising at least one turbomachine according to claim 1.

* * * * *